United States Patent [19]

Laing et al.

[11] Patent Number: 4,580,335

[45] Date of Patent: Apr. 8, 1986

[54] SPHERICAL ROTOR FOR ELECTRICAL MOTORS

[76] Inventors: Oliver Laing; Nikolaus Laing; Karsten Laing, all of Laing-Thermotech, 632 Marsat Ct., Chula Vista, Calif. 92011

[21] Appl. No.: 573,664

[22] Filed: Jan. 25, 1984

[30] Foreign Application Priority Data

Jan. 25, 1983 [DE] Fed. Rep. of Germany ....... 3302349

[51] Int. Cl.⁴ ..................... F04B 17/00; H02K 15/02
[52] U.S. Cl. ........................................ 29/598; 417/420
[58] Field of Search ...................... 72/342; 310/52, 54, 310/55, 57, 86, 87, 104, 166; 417/420, 367; 29/598

[56] References Cited

U.S. PATENT DOCUMENTS 4,352,646 10/1982 Laing et al. .................... 417/420
4,356,717 11/1982 Okunishi et al. ................. 72/342

*Primary Examiner*—Mark Rosenbaum
*Assistant Examiner*—Timothy V. Eley
*Attorney, Agent, or Firm*—Thomas J. Tighe

[57] ABSTRACT

Process for the manufacture of rotors for asynchronous electrical motors with spherical air gaps. These rotors are designed as permanent magnets with low coercive force and comparably high electrical conductivity so that eddy currents can be formed as long as rotor rpm is different from the frequency of the rotating field of the stator while these rotors convert to permanent magnets running under synchronous conditions at rated performance. The process steps are the following:

1. Milling an iron alloy with at least 5% cobalt to a sheet metal strip.
2. Producing of rings by stamping.
3. Annealing the rings to at least 1050° C.
4. Forming the rings to semi-spherical caps by a deep-drawing process at the annealing temperature pursuant to 3.

1 Claim, 2 Drawing Figures

Fig. 1
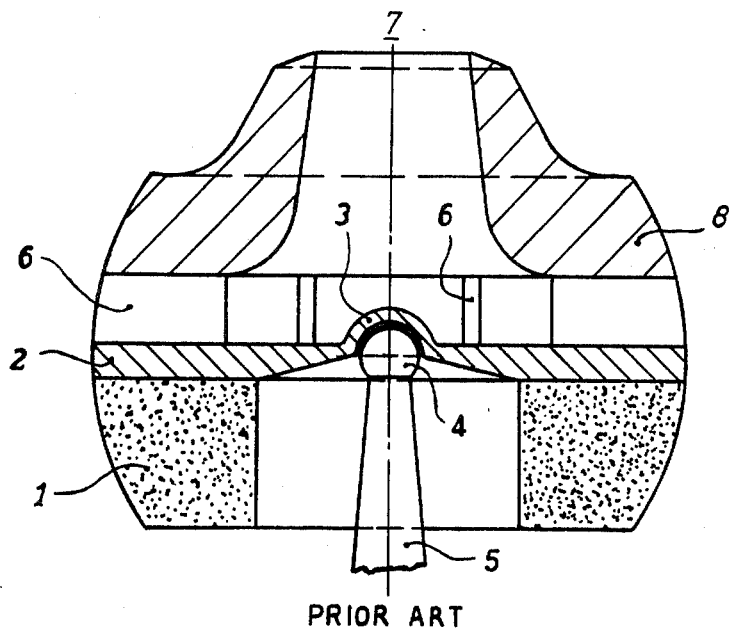
PRIOR ART
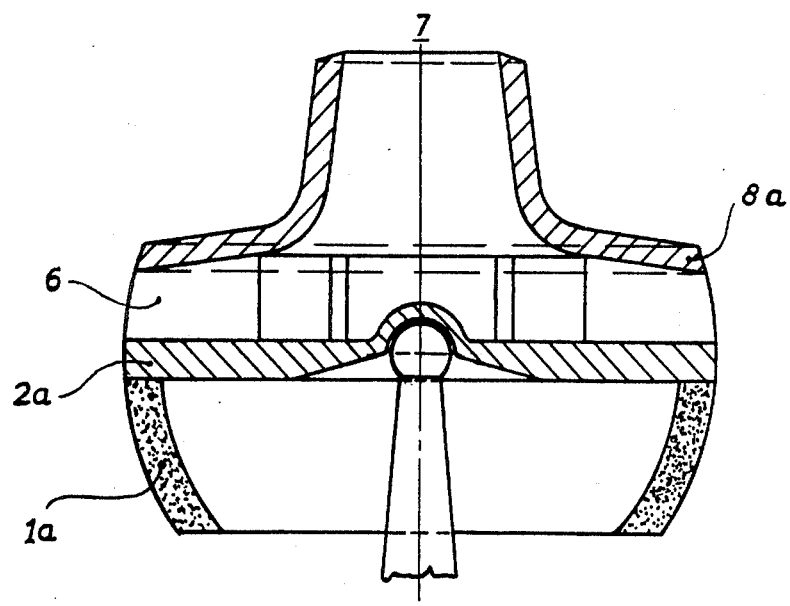
Fig. 2

SPHERICAL ROTOR FOR ELECTRICAL MOTORS

BACKGROUND OF THE INVENTION

The invention relates to rotors for electrical motors with a spherical magnetic air gap. Such motors now known as spherical motors have found an application to a large extent in pump construction. It has been shown that the design of spherical rotors featuring permanent magnets with low coercive force as described in U.S. Pat. No. 4,352,646, presents a great advantage over conventional rotors equipped with a squirrel cage. These magnets have semi-spherical configuration. This process utilizes materials which feature a comparably good electrical conductivity so that eddy currents are formed in the rotors, the motor being adapted to operate as an asynchronous motor during the start-up phase. As a result, oxide magnets are not suitable because their electrical conductivity is zero. Coercive force intensity should be so small that, when synchronous rpm has been reached, constant magnetization may occur through the magnetic flux of the stator. This can only be achieved by metal magnets.

The disadvantage of this solution is the fact that these magnets have been produced to date only by means of casting or sintering followed by high-temperature treatment and accordingly feature very wide manufacture tolerances. As a result, machinery is required which is costly in particular since the periphery of the magnet features a spherical surface and since the materials under consideration present exceptionally hard imbedments.

In addition, it has been shown that such parts cannot be produced with small wall thickness when made from a material which can be processed only in a powder metallurgical manner or which must be casted. For small motors within a power range of a few watts, caps with very small wall thickness are sufficient. Since these are technologically not feasible at this time, magnets must be utilized with unnecessarily thick walls. In addition, tolerances in the distribution of density of the materials in both production processes is so large that a significant effort must be made in the area of balancing. Also rotor impeller units supported in a way that permit tumbling movements require a counter weight on the impeller entrance heavy enough to compensate for the weight of the magnetic rotor. Unnecessarily heavy magnets therefore require unnecessarily heavy balancing masses. This may cause instability of the rotating rotor impeller unit which can tumble around the spherical bearing.

SUMMARY

The invention presents a magnetic spherical cap whose strength is determined only by required magnetic force. The invention is concerned with the process of producing this kind of rotors. The first step consists of the milling of a sheet alloy or iron and nickel as well as approximately 5% cobalt and possibly other alloy metals. At the second step rings are stamped from said sheet metal. As a third step these rings are annealed to a temperature of approximately 1050 C. required to reach the desired magnetic properties. As a fourth step at said temperature they are formed into caps by dies using a known draw process with water-cooled dies. This makes it possible to produce magnetic cap-shaped rotors with any low wall thickness while featuring such great geometrical form fidelity and uniform mass distribution that machining is not required. The invention makes it possible for the first time to produce reasonably-priced and dynamically stable running small pumps, as required in large numbers for domestic use.

The advantages are described below with reference to the accompanying drawings in which:

BRIEF DESCRIPTION OF THE DRAWINGS

FIG. 1 illustrates a conventional rotor impeller unit.

FIG. 2 a rotor impeller unit according to the invention.

DESCRIPTION OF THE PREFERRED EMBODIMENT

FIG. 1 shows a conventional rotor impeller unit with a thick-walled magnet (1), which is carried by the impeller (2) forming a spherical bearing cap (3) in the center. The bearing cap is supported by a ball (4) connected to the pump housing by means of a rod (5). The impeller (2) carries vanes (6) which are defined by a cover (8) to the inlet area (7). This cover (8) also acts as weight compensation for magnet (1).

FIG. 2 shows the rotor impeller unit pursuant to the invention. The impeller (2a) carries the magnet cap (1a), produced in the way as described above. Since the weight is significantly lower than that of the cast magnet, the cover (8a) may be designed significantly lighter.

I claim:

1. A manufacturing process for thin-walled and accurately shaped magnet caps of magnetic material for rotors of spherical motors comprising the following steps:
    (a) forming sheet metal strips from an alloy of at least iron, nickel and about 5% of cobalt,
    (b) stamping rings from these sheet metal strips,
    (c) annealing these rings to obtain low coercive force magnetic properties at a temperature of about 1,050 C. degrees, and
    (d) forming caps of these rings at about the annealing temperature by a deep draw press operation with watercooled dies.

* * * * *